United States Patent
Wolff et al.

(10) Patent No.: US 6,538,474 B2
(45) Date of Patent: Mar. 25, 2003

(54) DIGITAL INTERFACE WITH LOW POWER CONSUMPTION

(75) Inventors: Thomas Wolff, Zurich (CH); Rolf Friedrich Philipp Becker, Adliswil (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/906,594

(22) Filed: Jul. 17, 2001

(65) Prior Publication Data

US 2002/0075037 A1 Jun. 20, 2002

(30) Foreign Application Priority Data

Jul. 18, 2000 (GB) ............................................ 00402044

(51) Int. Cl.[7] ......................................... H03K 19/0175
(52) U.S. Cl. ............................... 326/86; 326/27; 326/62
(58) Field of Search .............................. 326/86, 83, 90, 326/26, 27, 62, 30

(56) References Cited

U.S. PATENT DOCUMENTS 5,111,080 A * 5/1992 Mizukami et al. .......... 307/475
5,519,728 A * 5/1996 Kuo ............................ 375/257
5,811,984 A 9/1998 Long et al. .................. 326/30

FOREIGN PATENT DOCUMENTS

EP         0963083 A2   8/1999   ............ H04L/25/02

\* cited by examiner

*Primary Examiner*—Daniel Chang
(74) *Attorney, Agent, or Firm*—Steven R. Biren

(57) ABSTRACT

The invention proposes an interface circuit having a very low power consumption and generating very low interference noise in the sensitive band of ratio chips. It is advantageously used to interface a microprocessor with a baseband radio processor in a telecommunication device, for example in DECT or GSM phones. The interface of the invention is current-driven. It comprises a current driver for transmitting a current in a transmission line depending on the data to be transferred. It also comprises a current receiver. The current receiver has an input node and an output node interconnected via a current mirror circuit, so that the voltage on said input node is near to the ground voltage and the voltage on said output node is changing depending on the transferred data.

6 Claims, 2 Drawing Sheets

DIGITAL INTERFACE WITH LOW POWER CONSUMPTION

BACKGROUND OF THE INVENTION

The invention relates to a digital input/output interface, and a telecommunication device using such an interface.

The invention is advantageously used for digital data transfers. For example, it may be used in digital mobile communication devices to transfer digital data from a baseband processor to an analogue radio transceiver.

Such a digital input/output interface is known from U.S. Pat. No. 5,811,984. The digital input/output interface described in this document comprises a current driver and a current receiver connected by a transmission line. The current driver is configured to pull a current from the current receiver when a digital signal is applied to the current driver. The current receiver includes a current conversion element connected to the transmission line at an input node through an input impedance $Z_{in}$, and an active termination element configured to adjust this input impedance $Z_{in}$ to match the characteristic impedance of the transmission line.

The drawback of this digital interface is that it is power consuming. Therefore, it would generate high interference noise in the sensitive band of radio frequency chips. This would make it impossible to transfer digital data to such chips while they are operating.

SUMMARY OF THE INVENTION

It is an object of the present invention to propose a digital input/output interface having a very low power consumption and hence generating low interfering noise in the sensitive band of radio frequency chips.

Another object of the invention is to propose an efficient input/output interface for use in digital mobile communication devices.

This is achieved with the input/output interface as claimed in claim 1. According to the invention, the voltage at the input node of the current receiver is small and remains approximately constant. As a consequence, if the interface is operated with low currents, the power consumption is very low. In the interface of the invention, the impedance of the line is not compensated anymore. But this is not critical at the data rates used in the contemplated applications under consideration (a few Mega-samples per second).

In an advantageous embodiment the proposed interface has a differential structure. In such a differential structure the same current is generated in one of the two branches depending on the data to be transferred. This leads to lower interference noise.

In another advantageous embodiment, the current receiver comprises a current source and a current adding element arranged to bias said current mirror circuit. This allows to increase the speed of the interface. This is especially useful when the interface has a differential structure, because in that case the branch of the current receiver that is switched off loses its bias.

The invention is explained in more detail below with the aid of illustrative embodiments, with reference to the drawings where:

DETAILED DESCRIPTION OF THE INVENTION

Figure 1:
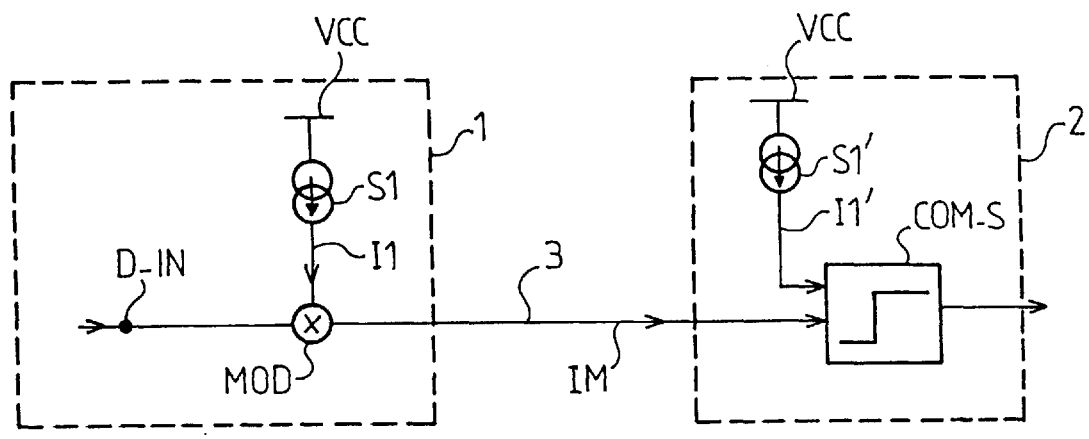
FIG. 1 is a diagram showing the principle of operation of the interface of the invention when the interface has a single structure.

FIG. 1 gives a schematic representation of the principle of the interface of the invention. This interface comprises a current driver 1 and a current receiver 2 connected by a transmission line 3. The current driver 1 comprises a data input D-IN, a current source S1 for delivering a constant current I1, a data modulator MOD for modulating the input data D-IN on constant current I1 and for generating a modulated current IM in the transmission line 3. The current receiver 2 comprises a current to voltage comparator COMP-S for comparing the incoming current IM with a reference current I1' generated by a constant current source S1' and which is approximately equal to current I1.

Figure 2:
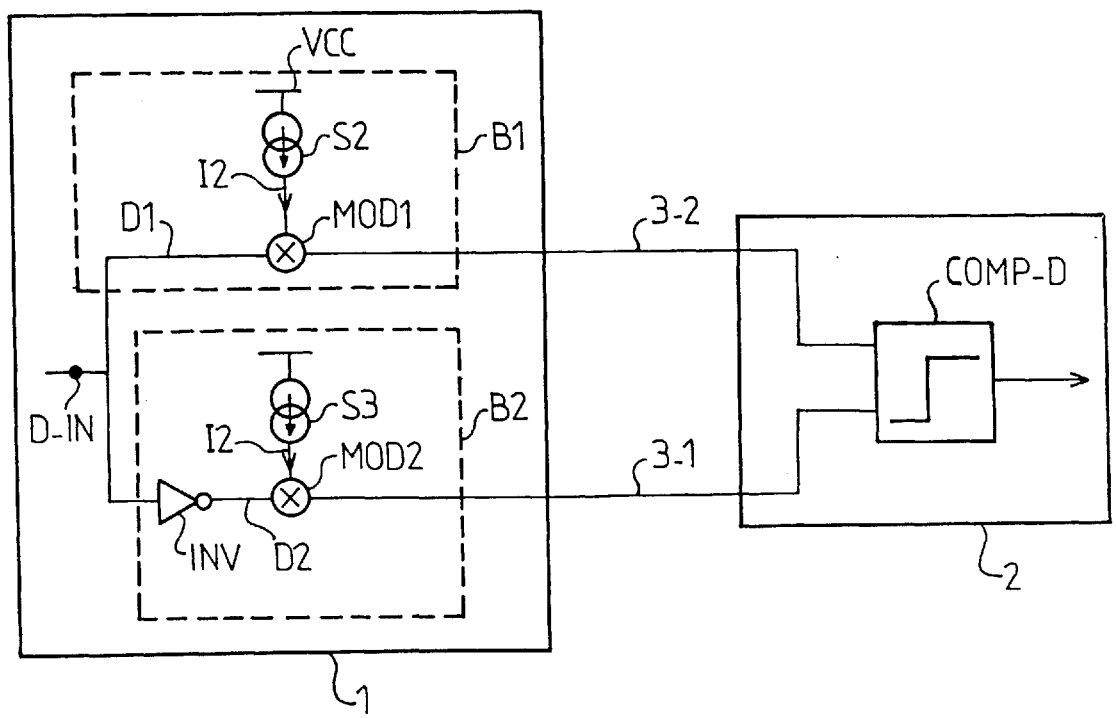
FIG. 2 is a diagram showing the principle of operation of the interface of the invention, when the interface has a symmetrical structure.

FIG. 2 gives another schematic representation of the principle of the interface of the invention, when this interface has a symmetrical structure. In this case the current driver 1 has two branches B1 and B2. Branch B1 is directly connected to the data input D-IN and comprises a data modulator MOD1. Branch B2 is connected to the data input via an inverter INV. It comprises a second data modulator MOD2. The data D1 present at the input of the data modulator MOD1 are inverted compared to the data D2 present at the input of the current modulator MOD2. Data D1 and D2 are modulated on a constant current I2, which is supplied by current sources S2 and S3. The transmission line 3 comprises two wires 3-1 and 3-2. The output of data modulator MOD1 is connected to wire 3-2. And the output of data modulator MOD2 is connected to wire 3-1. On the receiver side, both incoming currents are transmitted to a current to voltage comparator COMP-D. The result of the comparison gives the received data.

Figure 3:
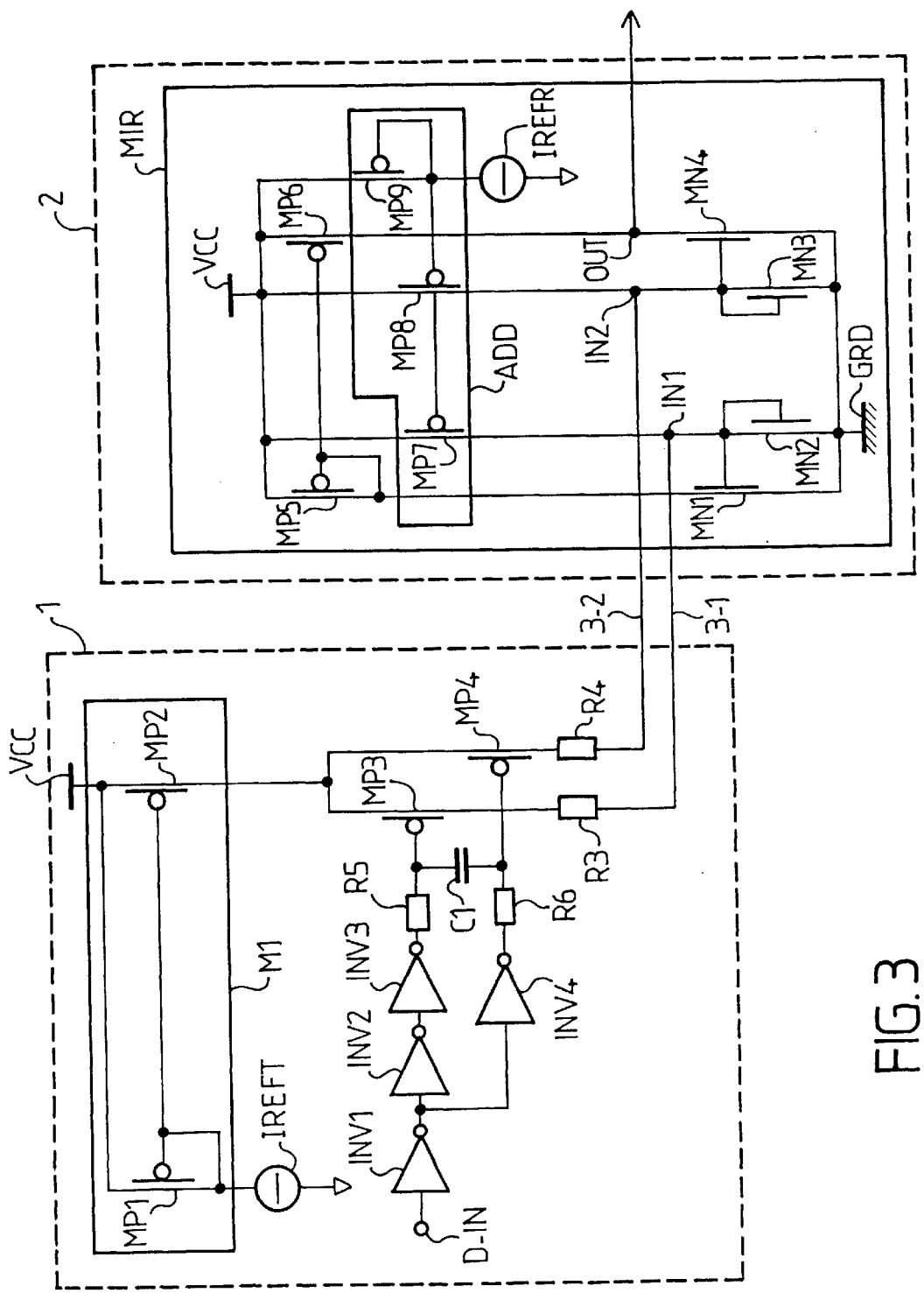
FIG. 3 is a diagram showing a preferred embodiment of the invention, when the interface has a differential structure.

FIG. 3 gives an example of a preferred embodiment of the invention, when the interface has a differential structure. In this embodiment the current source S2 comprises one current source IREFT and a current mirror M1. The current mirror M1 comprises two P-MOS transistors MP1 and MP2. The data modulators MOD1 and MOD2 comprise each one P-MOS transistor MP3 and MP4, respectively. The drains of these transistors are connected to the source of transistor MP2. The source of transistor MP3 is connected to wire 3-1 via a resistor R3, and the source of transistor MP4 is connected to wire 3-2 via a resistor R4. The data input D-IN is connected to the gate of transistor MP3 via 3 data inverters INV1, INV2 and INV3, and a resistor R5. It is also connected to the gate of transistor MP4 via two inverters INV1 and INV4, and a resistor R6. Inverters INV1, INV2, INV3 and INV4 also have an amplification function. The gates of transistors MP3 and MP4 are also interconnected with one another via a capacitor C1. Resistors R5 and R6 and capacitor C1 have a filtering function.

Resistors R3 and R4 together with the parasitic capacitance of the wires have the function of a low-pass filter. The cut-off frequency of this low-pass filter may be reduced by having an additional capacitor across resistors R3 and R4 external to the integrated circuit.

The current receiver has two input nodes IN1 and IN2, and one output node OUT. Input node IN1 is connected to wire 3-1. Input node IN2 is connected to wire 3-2. Input nodes IN1 and IN2 are connected to output node OUT via a current mirror circuit MIR.

Current mirror circuit MIR comprises 3 current mirrors M2, M3 and M4. Current mirror M2 comprises two N-MOS transistors MN1 and MN2. Current mirror M3 comprises two N-MOS transistors MN3 and MN4. And current mirror M3 comprises two P-MOS transistors MP5 and MP6.

The gates of transistors MN1 and MN2 are connected to input node IN1. The gates of transistors MN3 and MN4 are connected to input node IN2. The drains of transistors MN4 and MP6 are connected to output node OUT. The drain of transistor MN3 is connected to input node IN2. The drain of transistor MN2 is connected to input node IN1. The drain of transistor MN1 is connected to the drain of transistor MP5. The sources of transistors MN1, MN2, MN3 and MN4 are connected to ground GRD. The sources of transistors MP5 and MP6 are connected to the common voltage VCC. The gates of transistors MP5 and MP6 are connected to the drain of transistor MP5.

The current receiver also has a current source IREFR and a current adding element ADD arranged to bias the current mirror circuit MIR. The current adding element is a current mirror comprising three transistors MP7, MP8 and MP9. Transistor MP7 has its source connected to a common voltage VCC and its drain connected to input node IN1. Transistor MP8 has its source connected to the common voltage VCC and its drain connected to input node IN2. Transistor MP9 is copying current IREFR in transistors MP7 and MP8. The function of this current adding element is to continuously bias both branches of the current receiver. The branch of the current receiver which is switched off is still biased and therefore tunes faster to its operation point. As a consequence, the speed of the interface is increased.

Transistors MP6 and MN4 have the function of a current to voltage comparator. Current mirror M3 is used to copy the current flowing in wire 3-2 in transistor MN4. Current mirrors M2 and M4 are used to copy the current flowing in wire 3-1 in transistor MP6. When transistor MP6 is conductive, transistor MN4 is blocked and vice versa.

As a consequence, when the data present on the data input D-IN is high, transistor MP4 is conductive, so that a current is flowing through wire 3-2. On the receiver side current mirror M3 copies this current in transistor MN4. Thus the voltage on output node OUT is high. When the data present on the data input D-IN is low, transistor MP3 is conductive, so that a current is flowing through wire 3-1. On the receiver side current mirrors M2 and M4 copy this current in transistor MP6. Thus the voltage on output node OUT is low.

In this embodiment input nodes IN1 and IN2 are connected to ground via a gate-source junction of an N type metal-oxide semiconductor. Thus the voltage on both input nodes remains approximately constant and very low. As a consequence, the power consumption and the interference noise are also very low.

This invention is not restricted to the preferred embodiment described above. In particular, the interface of the invention may have a single structure rather than a differential structure.

In the above description, metal-oxide semiconductors are used. This is not restrictive. For example it is also possible to use bipolar semiconductors.

What is claimed is:

1. A digital input/output interface comprising a current driver and a current receiver connected by a transmission line, the current driver being configured to receive a digital signal and to generate a current in the transmission line depending on said digital signal, and the current receiver comprising an input node for receiving the current from the transmission line and an output node for outputting a voltage, said input node being connected to said output node through a current mirror circuit for copying the received current and the voltage at said output node being generated from said copied current so that a voltage at said input node is small and remains approximately constant.

2. The digital input/output interface as claimed in claim 1, wherein the voltage at said input node is close to a threshold voltage of a transistor.

3. The digital input/output interface as claimed in claim 1, wherein said current mirror circuit comprises at least a current mirror for copying the current generated in said transmission line in one transistor for converting said copied current into a voltage indicative of the value of said digital signal.

4. The digital input/output interface as claimed in claim 1, wherein said current driver and said current receiver are differential circuits and said transmission line comprises two wires, said current driver being configured to generate a current in only one of said wires at a time.

5. The digital input/output interface as claimed in claim 1, wherein the current receiver comprises a current source and a current adding element arranged to bias said current mirror circuit.

6. A telecommunication device comprising a digital input/output interface, wherein said digital input/output interface comprises a current driver and a current receiver connected by a transmission line, the current driver being configured to receiver a digital signal and to generate a current in the transmission line depending on said digital signal, and the current receiver comprising an input node for receiving said current from said transmission line and an output node for outputting a voltage, said input node being connected to said output node through a current mirror circuit for copying said received current and the voltage at said output node being generated from said copied current so that a voltage at said input node is small and remains approximately constant.

* * * * *